US009100874B2

(12) United States Patent
Yaqub et al.

(10) Patent No.: US 9,100,874 B2
(45) Date of Patent: Aug. 4, 2015

(54) QUALITY OF SERVICE PROVISIONING THROUGH ADAPTABLE AND NETWORK REGULATED CHANNEL ACCESS PARAMETERS

(75) Inventors: Raziq Yaqub, Fort Lee, NJ (US); Moncef Elaoud, Lake Hopatcong, NJ (US)

(73) Assignees: TOSHIBA AMERICA RESEARCH, INC., Washington, DC (US); TELCORDIA TECHNOLOGIES, INC., Piscataway, NJ (US)

(*) Notice: Subject to any disclaimer, the term of this patent is extended or adjusted under 35 U.S.C. 154(b) by 0 days.

(21) Appl. No.: 11/567,251

(22) Filed: Dec. 6, 2006

(65) Prior Publication Data

US 2007/0206552 A1    Sep. 6, 2007

Related U.S. Application Data

(60) Provisional application No. 60/853,310, filed on Mar. 5, 2006.

(51) Int. Cl.
  *H04W 72/00* (2009.01)
  *H04W 28/24* (2009.01)
  *H04W 16/10* (2009.01)
  (Continued)

(52) U.S. Cl.
  CPC .............. *H04W 28/24* (2013.01); *H04W 16/04* (2013.01); *H04W 16/10* (2013.01); *H04W 28/16* (2013.01)

(58) Field of Classification Search
  CPC ..... H04W 16/00; H04W 16/04; H04W 16/10; H04W 72/08; H04W 16/08; H04W 28/02; H04W 28/08; H04W 28/16; H04W 36/22; H04W 48/06; H04W 36/00
  USPC .............. 455/434, 452.2, 453, 436, 438, 439, 455/442, 450, 509, 63.1, 114.2; 370/338, 370/237, 329, 331–334, 341, 395.21
  See application file for complete search history.

(56) References Cited

U.S. PATENT DOCUMENTS 6,359,901 B1 * 3/2002 Todd et al. .................... 370/465
7,123,910 B2 * 10/2006 Lucidarme et al. ........... 455/434
(Continued)

OTHER PUBLICATIONS

International Search Report, dated Jul. 30, 2008.
(Continued)

*Primary Examiner* — Khalid Shaheed
*Assistant Examiner* — Shantell L Heiber
(74) *Attorney, Agent, or Firm* — Westerman, Hattori, Daniels & Adrian, LLP (57) ABSTRACT

One or more system and/or method of dynamically setting values of Channel Access Parameters employing a Load Supervision Manager entity, a Quality of Service Parameters Manager entity, and an Access Point. The entities work with the Access Point and continuously monitors network loading conditions and setting Channel Access Parameters values in response to network loading conditions. The Load Supervision Manager is a controlling and/or supervisory entity that sits at a network level receives information from the QoS Parameters Manager which sits at a subnet level, and judges prevailing loading conditions. The prevailing loading conditions include such factors as the number of Mobile Nodes and the applications or ACs they are running on in each subnet. The QoS Parameters Manager assesses the possible near future loading condition in each subnet including monitoring the hand-off Mobile Nodes and issues directives to QoS Parameters Managers.

5 Claims, 4 Drawing Sheets

QoS Provisioning through Adaptable Multiple Parameters (51) Int. Cl.
*H04W 16/04* (2009.01)
*H04W 28/16* (2009.01)

(56) References Cited

U.S. PATENT DOCUMENTS

| | | | | |
|---|---|---|---|---|
| 2003/0179731 | A1* | 9/2003 | Noguchi et al. | 370/331 |
| 2004/0264423 | A1* | 12/2004 | Ginzburg et al. | 370/338 |
| 2005/0044237 | A1* | 2/2005 | Sitaraman et al. | 709/227 |
| 2006/0171348 | A1* | 8/2006 | Nokano | 370/328 |
| 2007/0076671 | A1* | 4/2007 | Winget et al. | 370/338 |
| 2007/0165537 | A1* | 7/2007 | Magnusson et al. | 370/254 |
| 2008/0095124 | A1* | 4/2008 | Ramos et al. | 370/336 |

OTHER PUBLICATIONS

International Search Report, Aug. 1, 2008, pp. 1-4.
Canadian Office Action dated Nov. 15, 2013, issued in Canadian Patent Application No. 2644151.

* cited by examiner

Figure 1 : QoS Provisioning through Adaptable Multiple Parameters

| AC | Default Settings for EDCA Station (Prior Art) | | | Proposed Values = Default EDCA Values ± Δ | | |
|---|---|---|---|---|---|---|
| | $CW_{min}$ | $CW_{max}$ | AIFS | $CW_{min}$ | $CW_{max}$ | AIFS |
| AC-BK | 31 | 1023 | A (e.g. 7) | 31 ± Δ | $CW_{max}$ ± Δ | A ± Δ |
| AC-BE | 31 | 1023 | B (e.g. 3) | 31 ± Δ | $CW_{max}$ ± Δ | B ± Δ |
| AC-VI | 15 | 31 | C (e.g. 2) | 15 ± Δ | $CW_{max}$ ± Δ | C ± Δ |
| AC-VO | 7 | 15 | D (e.g. 2) | 7 ± Δ | $CW_{max}$ ± Δ | D ± Δ |

Figure 2 : Default Settings for EDCA Stations and Proposed Settings

Figure 3 : Multiple Parameters Allocation Algorithm

Figure 4 : QoS Violation Detection Algorithm

Figure 5 : Multiple Parameters Allocation Algorithm With Lease Time

QUALITY OF SERVICE PROVISIONING THROUGH ADAPTABLE AND NETWORK REGULATED CHANNEL ACCESS PARAMETERS

CROSS-REFERENCE TO RELATED APPLICATIONS

This present application claims priority under 35 U.S.C. 119 to the U.S. Provisional Application 60/853,310, filed Mar. 5, 2006, entitled "QoS Provisioning Through Adaptable and Network Regulated Channel Access Parameters (ANR-CAP)", the entire disclosure of which is incorporated herein by reference.

BACKGROUND

1. Field of the Invention

The present application relates to wireless networking and, in some preferred embodiments, to systems and methods of wireless Quality of Service (QoS) Provisioning through Adaptable and Network Regulated Channel Access Parameters (ANR-CAP) in wireless networks and/or the like.

2. General Background Discussion

Networks and Internet Protocol

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computers, etc.) to another device on a network. There are a variety of versions of IP today, including, e.g., IPv4, IPv6, etc. Each host device on the network has at least one IP address that is its own unique identifier.

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router, or a workstation. Messages destined for some other host are not passed up to the upper layers but are forwarded to the other host. In the OSI and other similar models, IP is in Layer-3, the network layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g. a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g. USB, CODEC, UART, PCM, etch); and/or the like.

Wireless LANs (WLANs) in which a mobile user can connect to a local area network (LAN) through a wireless connection may be employed for wireless communications. Wireless communications can include, e.g. communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address, and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3 G cellular devices, 2.5 G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (i.e. outside mobile IP), typically, routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Wireless networks are expected to support different Quality of Service (QoS) classes of traffic that have diverse bandwidth, delay, and packet loss requirements. These QoS classes may range from e.g., E-mails to realtime multimedia services. The most critical layers to support different QoS classes are Physical, Medium Access Control (MAC), and Network. Though the Wire-Line part of the network, particularly if it equipped with optical fiber, can meet the future bandwidth needs, the wireless part of the network presents a bottleneck in delivery of bandwidth hungry time sensitive applications because bandwidth is a scarce resource. This calls for introduction of layer 2 prioritized delivery mechanisms for different traffic classes for service differentiation and QoS provisioning.

The IEEE 802.11e task group enhanced the current 802.11 MAC and interrelated protocol efficiency to expand support for applications with QoS requirements. This effort involved usage of different sets of Channel Access Parameters (CAP) for different classes. The CAP includes Arbitration Inter-Frame Spaces (AIFS) and Contention Windows (CW). Though CAP (i.e., AIFS and CW) differentiation provides superior and more robust operation it institutes several performance issues. For example it does not consider the adaptability of CAP values duly tailored with the prevailing load conditions. Moreover it restricts the set of CAP for each Access Category (AC), per Mobile Node (MN), rather than per AC. Furthermore it does not consider the fact that some Mobile Nodes (MNs) may claim false priorities, set their CAP to the highest priority (small AIFS, small CW etc.), and enjoy priority treatment that they might not deserve because they might not be actually running time sensitive applications. Under this situation the network is handicapped to assess authenticity of MNs priority claim and hence cannot do anything except to trust MNs and keep providing them the differentiated treatment.

A lot of work has been done to provide guaranteed QoS for enhanced user experience. However, guaranteed QoS is not easily achievable in Packet Switched Networks as compared to Circuit Switched Networks. The difference is due to the fact that Circuit Switched Networks provide dedicated links for each connection while Packet Switched Networks do not. Furthermore when the Undedicated Packet Switched Networks are bridged over "Wireless" (specifically IEEE 802.11 WLANs), the promise of QoS becomes a little more difficult because all MNs share the access to the same radio channel. In addition to these anomalies, when these networks are required to serve delay sensitive, packet loss intolerant, or bandwidth hungry multimedia applications, QoS guarantee becomes more challenging because the number of users demanding multimedia applications may be erratic. Thus, the service differentiation mechanisms must be compulsorily introduced at the MAC layer. The IEEE 802.1 le task group, chartered to introduce QoS support at the MAC layer, strived to enhance current MAC and associated protocols so that the applications demanding differentiated treatment can be supported efficiently. The current 802.1 le draft standard defines two mechanisms, enhanced distributed channel access (EDCA), and hybrid coordination function (HCF) controlled channel access (HCCA), both of which are backward compatible with the legacy distributed coordination function (DCF) access mechanism defined by the 1999 standard [1].

EDCA

According to 802.1 le's EDCA approach, user applications are classified into four classes or Access Categories (AC) for differential treatment. These ACs are in line with those defined by 3GPP and are given below:
1) AC-Back Ground (AC-BG);
2) AC-Best Effort (AC-BE);
3) AC-Video (AC-VI); and
4) AC-Voice (AC-VO).

AC-BG and AG-BE are referred as Background and Interactive Traffic Classes. They carry Non-Real-Time Traffic, i.e., traditional Internet applications, e.g., web browsing, telnet, email, and FTP.). AC-VI and AC-VO stand for Video and Voice, and are also referred to as Streaming/Conversational Classes. They carry Real-Time Traffic flows.

Packets arriving at the MAC (MSDUs) are mapped into the foregoing four ACs that represent four different levels of service in contention for the shared medium. Each AC contends for the medium with the same rules as the standard DCF (i.e., wait until the channel is idle for a given amount of Interframe Space (IFS) and then access/retry following exponential back-off rules). The access probability differentiation for different ACs is provided by using different sets of Channel Access Parameters referred to as CW Differentiation and AIFS Differentiation.

CW Differentiation; CW differentiation refers to the back-off times through different settings of the CWmin and CWmax parameters per above noted class. EDCF uses the contention window to assign priority to each AC. Indeed, assigning a short contention window to a high priority AC ensures that in most cases, high priority AC is able to transmit ahead of low priority one. Thus, the CWmin and CWmax parameters can be set differently for different access categories, such as, a high priority AC with small values of CWmin and CWmax. Moreover CW differentiation can be used to differentiate users within the same AC.

AFPS Differentiation: The AIFS (Arbitration InterFrame Space) refers to the amount of time a MN defers access to the channel following a busy channel period, i.e., after every busy channel period, each MN waits for a time equal to its AIFS value. EDCA proposes using different AIFS values for different access categories (AC) instead of the constant distributed IFS (DIFS) used in DCF. Thus the flows with shorter AIFS values may access the channel, while the flows with longer AIFS values are prevented from accessing the channel. Once an AIFS has elapsed, the MN access is managed by the normal back-off rules. AIFS values differ for an integer number of slot times. This implies that the channel access can be still considered slotted, and MNs may access the channel only at the discrete time instants. The typical values of AIFS are 7, 3, 2 and 2 for above noted four classes.

CW and AFIS in this document are referred as Channel Access Parameters, abbreviated as CAP. Though CAP differentiation approach of EDCA provides superior performance, however, it presents several drawbacks as well as gaps in the standard that need to be filled, e.g.

1. It trusts the MNs to select CAP for themselves and ignores the fact that MNs can falsely set its traffic parameters to the highest priority (small AIFS and small CWmin). And if all the MNs set the highest priorities, the spirit of the concept dies.

2. There are fixed default values of AP for each AC (i.e., greater AIFS and CWmin for AC-BK, AC-BE, and smaller AFIS and CWmin for AC-VI, AC-VO) regardless of the prevailing loading conditions. In case of light loading condition this may be a less critical problem, however in case of heavily loaded condition, the obvious drawback would be that smaller CWmin values would lead to smaller aggregate throughput, or higher delay that would adversely impact the acceptable QoS. This is because reduction of the CWmin value during congestion may significantly increase the probability of collision on the channel, thus reducing the overall effectiveness of the mechanism.

SUMMARY

While a variety of systems and methods are known, there remains a need for improved systems and methods. In order to address this and some other problems new system is provided for QoS provisioning that makes CAP adaptable and network regulated.

In accordance with a broad embodiment of the invention two new functional entities are provided on the network side for dynamic adaptability of CAP, specifically, regulatory judgment and enforcement of fairness under prevailing situations. The operation is initiated by either arrival or departure of a connection that may be due to new connection setup, hand-off, termination of existing connection, or abrupt channel condition variations.

According to an embodiment of this invention, two new entities, "Load Supervision Manager (LSM)", and "QoS Parameters Manager (QPM)", work together with Access Point (AP) to judicially decide functions, as for example, whom to provide, when to provide, how much to provide, whether to provide, when to relegate, and how to deprive the policy violators from the privilege of enhanced QoS parameters.

According to a further embodiment of the invention, the entities, Load Supervision Manager and Quality of Service Parameters Manager continuously monitor the network loading conditions and take appropriate actions (i.e., Upgrade CAP—By Shrinking AIFS and CW, or Degrade CAP—By Stretch AIFS and CW), and can also watch for policy compliance and take suitable steps (i.e. send warning or deny access).

In accordance with an embodiment of the invention:

1) A Network makes record of MNs, along with their traffic specifications, present within the radio jurisdiction of each cell;

2) The network estimates CAP values initially based on subscription credentials and keeps fine tuning them dynamically adapted both to prevailing and near future network load conditions;

3) The network requests MNs to release upgraded CAP and switch back to default or downgraded CAP when unfavorable conditions are encountered, such as severe congestions, or reduced throughput due to poor radio conditions, etc.;

4) The network checks the MNs' compliance, issues warnings to the violators, and ultimately denies access through EP (Enforcement Point) or SNMP to the persistent violator.

ABBREVIATIONS

In this disclosure, the following abbreviations are used.

| | |
|---|---|
| Arbitration Inter-Frame Spaces | (AIFS) |
| Access Category | (AC) |
| AC Video | (AC-VI) |
| AC Voice | (AC-VO) |
| Arbitration InterFrame Space | (AIFS |
| Adaptable and Network Regulated | (ANR) |
| Channel Access Parameters | (CAP) |
| Controlled channel access | (HCCA) |
| Contention Windows | (CW) |
| Distributed coordination function | (DCF) |
| Extensible Authentication Protocol over LAN | (EAPOL) |
| Enhanced DCF | (EDCF) |
| Enhanced Distributed Channel Access | (EDCA) |
| Enforcement Point | (EP) |
| Enhanced QoS-parameters Lease Time | (EQLT) |
| Hybrid coordination function | (HCF) |
| Interframe Space | (IFS) |
| Load Supervision Manager | (LSM) |
| MAC Service Data Units | (MSDUs) |
| MAC Layer Management Entity | (MLME) |
| Medium Access Control | (MAC) |
| Mobile Node | (MN) |

| | |
|---|---|
| Simple Network Management Protocols | (SNMP) |
| Quality of Service | (QoS) |
| QoS Parameters Manager | (QPM) |

The above and/or other aspects, features and/or advantages of various embodiments will be further appreciated in view of the following description in conjunction with the accompanying figures. Various embodiments can include and/or exclude different aspects, features of other embodiments where applicable. The descriptions of aspects features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the various inventions described herein and that such examples are not intended to limit the invention to preferred embodiments described herein and/or illustrated herein.

The present invention takes a completely different approach to address the above noted issues. Rather than picking up differentiated CAP, by the MNs, the network advises the MNs to use newly baked values duly tailored with their requirements as well as prevailing load conditions. Moreover instead of fixing the default set of values for CAP for each access category, they are flexible and the network fine tunes them dynamically according to the prevailing load situations. Thus, the CAP values are re-examined each time the network loading condition varies.

According to an embodiment of this invention, two new entities, "Load Supervision Manager (LSM)", and "QoS Parameters Manager (QPM)", work together with Access Point (AP) to judicially decide whom to provide, when to provide, how much to provide, to provide, when to relegate, and also how to deprive the policy violators from the privilege of enhanced QoS parameters. In other words, these functional entities continuously watch for the network loading conditions and take appropriate actions (i.e., Upgrade CAP—By Shrinking AIFS and CW, or Degrade CAP—By Stretch AIFS and CW), and furthermore watch for policy compliance and take suitable steps (i.e. send warning or deny access).

Figure 1:
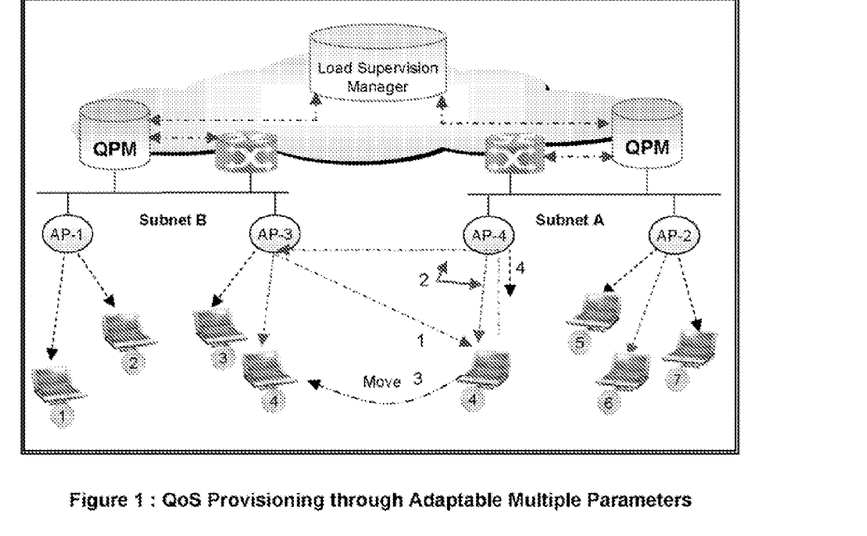
FIG. 1 is a diagrammatic representation of a wireless network in which Quality of Service provisioning is provided through adaptable multiple parameters.

Looking now to FIG. 1, it is seen that AP-1 is serving two Mobile Nodes MN101 and MN 102. In a case where both MN 101 and MN 102 are running non-real time applications, no differential treatment is offered to either of them and the MNs have regular CAP as supported by prior EDCA art.

Now look at AP2 that is serving three Mobile Nodes (MN 105, MN 106, and MN 107). In an example in which MN 106 initiated video session, while MN 105 and MN 107 are running non-real time applications. According to this embodiment of present invention, differential treatment will be provided to the MNs, i.e., AP-2 will advice MN 106 to use upgraded CAP where as MN 105 and MN 107 use regular CAP.

In another example, AP4 that is offering MN 104 an upgraded CAP and MN 104 is moving from AP4 to AP3. According to an embodiment of the present invention this movement will be notified to the network so that the candidate AP, in this case MN-104 continues to be provided up graded CAP, even after it has moved to the radio jurisdiction of AP3. In this example, MN-104 is arriving in a cell that is already congested. Thus, in a new cell MN-104 may continue to be provided differential services, but the differential services could be a somewhat downgraded CAP, calculated as per the prevailing situation of destination cell, or the AP may attribute the network congestion first to the MNs having best effort AC.

In the background art MNs, can be made to intentionally select AC parameters pertaining to the highest priority to get better performance. Moreover there are fixed default values of CWmin, CWmax, and AIFS, for each AC regardless of the prevailing loading conditions. To address these concerns, the present invention takes a novel approach; one in which the network selects the qualified MNs and advices them to use the differentiated parameters. This approach is also different from the prior art because the default values of CW and AIFS, can also be varied dynamically and adapted to the prevailing load situations. This novel approach not only resolves the above noted and some other issues, but also provides several advantages described in further detail hereinafter.

To achieve the objectives according to the embodiment of the present invention, two new entities, "Load Supervision Manager (LSM)", and "QoS Parameters Manager (QPM)", as shown in FIG. 1 are introduced that work together with Access Point (AP) to judicially decide whom to provide, when to provide, how much to provide, and also when to deprive the policy violators from the privilege of enhanced QoS. Each entity has its own specific tasks as explained below. AP and QPM can exchange signaling messages between themselves; however AP can not communicate with LSM directly but through QPM.

Tasks Performed by the LSM:

The LSM is mainly a controlling or supervisory entity. From hierarchy point of view the LSM sits at a campus/corporate network level, and receives information from QPMs sitting at subnet levels. The LSM's key responsibility is to judge the prevailing loading conditions (i.e. number of MNs, and the applications or ACs they are running on in each subnet), assess the possible near future loading condition in each subnet including monitoring the hand-off MNs (i.e. MNs moving in and out of cells) and issue directives to QPMs. The LSM performs the following specific functions.

1. The LSM periodically gets from the QPM the "Current Load Information" and from this information "Predicted Load Demand", served by each AP.
2. In the case in which the MN moves from one subnet to another, the LSM receives a copy of EAPOL-Start message from MLME of AP through the QPM of the cell where the MN is currently present. From this EAPOL-Start message, LSM extracts (i) Source Address of the AP (where MN is currently present) (ii) Destination Address of the AP (where MN intends to move and has requested Pre-authentication) and (iii) Current IP Address of MN (belonging to the network where MN is presently located). The LSM uses this information in assessing and predicting load conditions. The LSM also informs the QPM of the candidate subnet to which the mobile node is moving, ahead of time for dynamic adjustment re-adjustment of AFIS and CWmin on a per MN and a per class basis, (Note: According to 802.1X standard, MN sends EAPOL-Start (Extensible Authentication Protocol over LAN) message to the AP with which it is currently associated. This message is initiated by an MN that intends to move from the radio jurisdiction of one AP to the radio jurisdiction of some other AP and wants to pre-authenticate itself ahead of time with a candidate AP).

3. LSM will save the information received from AP of each cell duly mapped with time.

Figure 3:
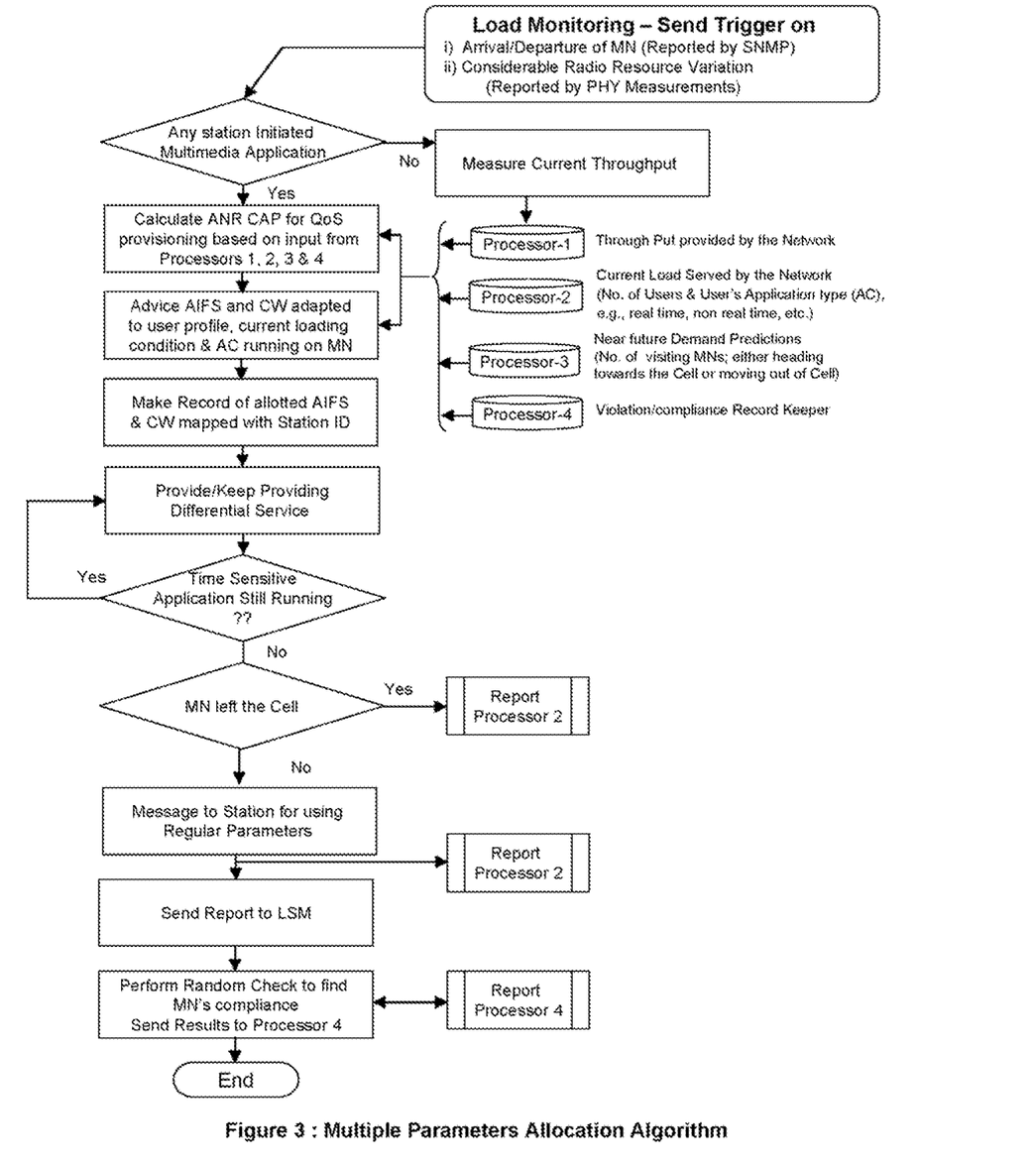
FIG. 3 is a flow chart representation of a multiple parameters allocation algorithm.

Tasks Performed by the QPM:

From a hierarchal point of view, the QPM sits at the subnet level and performs the following specific functions, as illustrated in the flow diagram of FIG. 3:

1. QPM monitors load and initiates the algorithm shown in FIG. 3 in response to load variation. This load variation may be either due to arrival/departure of an MN (that may be due to new connection setup in that cell, hand-off in the cell or handing off to the neighboring cell, or termination of connection) or due to radio resource fluctuation. To establish stability and to avoid ping-pong effect, the QPM will respond to the load variations if the variations are significant enough. Thus no action will be taken if the fluctuations are small and are in between specified upper and lower bounds of predefined conditions.

2. The QPM can be associated with four processors that help it perform its tasks efficiently. These processors perform various essential functions, e.g., A) Processor-1 has the knowledge of currently available throughput of each cell. It gets this knowledge by translating existent Signal to Noise Ratio (SNR) into real time available throughput as per following renowned mathematical relation:

$$C=B*\log 2(1+S/N),$$

Where C is the achievable channel capacity, B is the bandwidth, S is the average signal power and N is the average noise power;

B) Processor-2 monitors the total number of MNs in the cell, their applications (AC-BK, AC-BE, AC-VI, or AC-VO, etc.,) and their subscription profile. It gets this knowledge either from the SNMP, or AP at the time when an MN associates itself and sends an authentication request;

C) Processor-3 has the understanding of future demand. It attains this knowledge from (i) LSM based on MN's handover to or from one cell to another and (ii) the historical log prepared by itself on how many connections are terminated or established, and how many hand-off connections occur on hourly, daily, weekly, and or monthly basis; and D) Processor-4 is a violation/compliance record keeper.

Based on the information that is received from these processors, new CAP values are calculated for each individual MN that is running a real time application. These values are communicated to the MNs through the AP. It should be understood that average values can be estimated according to the prevailing conditions, and communicated to all deserving MNs rather than estimating CAP values for each individual MN. Additionally, fresh CAP values for legacy terminals can be also be separately calculated and communicated.

3. The QPM keeps the record of the CAP (upgraded, regular or downgraded), that it offered to each MN in each cell duly mapped with the MNs' ID, as for example, MAC addresses, IP address, or any other unique ID that could be used for identification of the client.

4. If the algorithm of FIG. 3 is triggered due to arrival of a multimedia session, based on the prevailing situation, the QPM will advise the new entrant to use new (upgraded) CAP.

5. If the algorithm of FIG. 3 is triggered due to radio resource variations, the available throughput will be measured and reported to processor-1 as shown in FIG. 3. The processor in turn can take several steps to ensure optimum performance. These steps may include for example, preventing brand new sessions from using upgraded CAP, or advising the new entrants to use a new (or adjusted) CAP. Depending on the available throughput, it may also advise existing MNs to use an adjusted CAP. This reduction could be continuous or discrete. However, discrete reduction is preferred for better system stability. Reduction in AIFS can be in terms of discrete integer number of slot time, and reduction in CWmin can be in terms of exponential or linear steps.

6. If the load variation is due to departure of a multimedia session, the QPM informs the LSM and updates processor-2. The QPM will also report to the LSM the information regarding available bandwidth capacity/throughput, used capacity, predicted demand, and service delivery report periodically.

Figure 2:
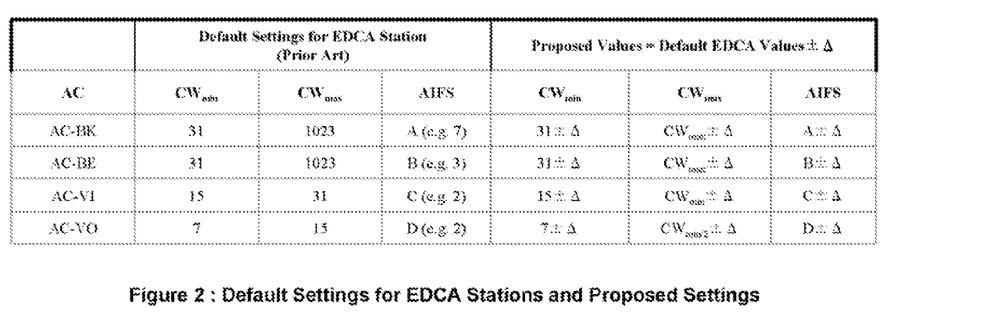
FIG. 2 is a chart illustrating default settings for EDCA stations and proposed settings.
Figure 4:
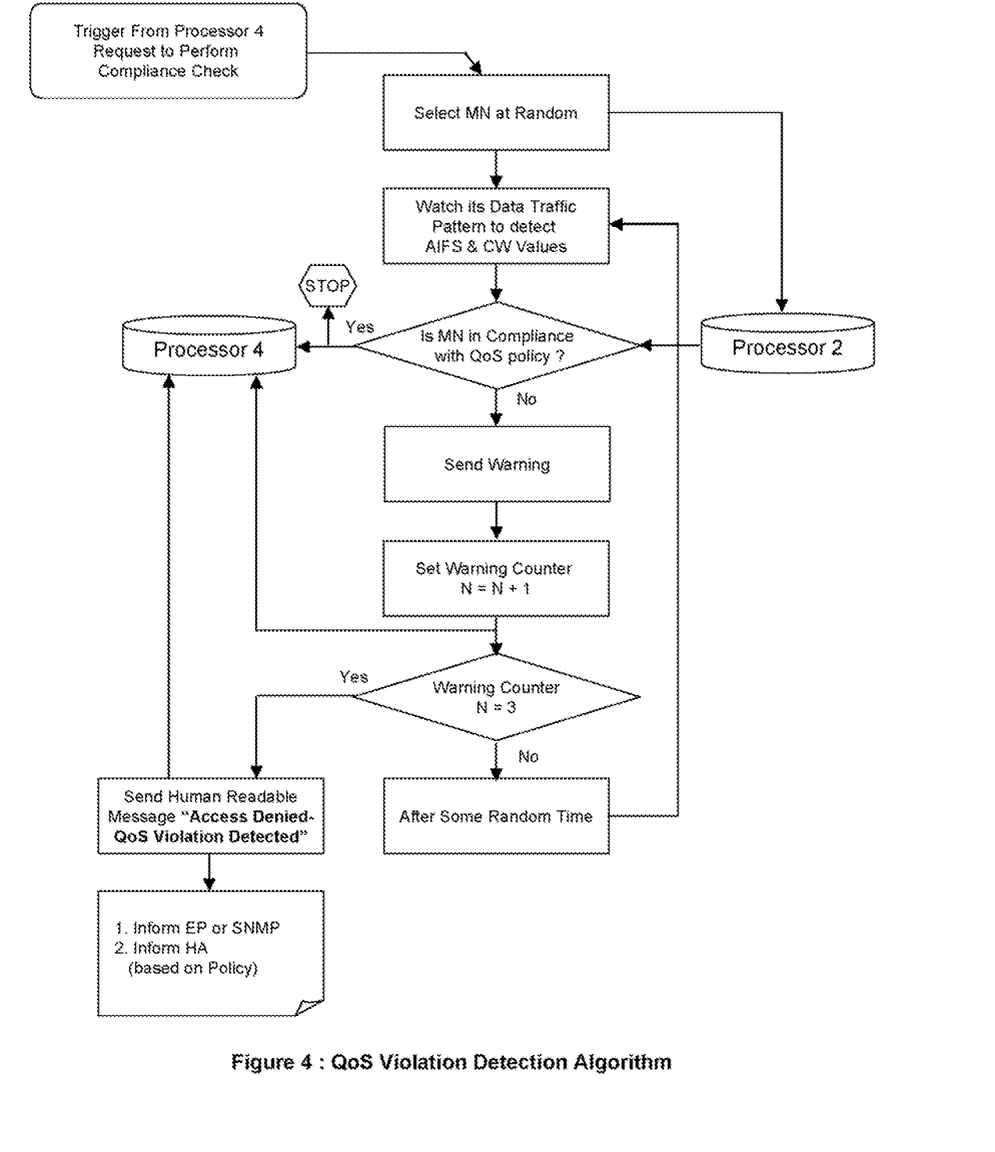
FIG. 4 is a flow chart representation of a QoS violation detection algorithm.
Figure 5:
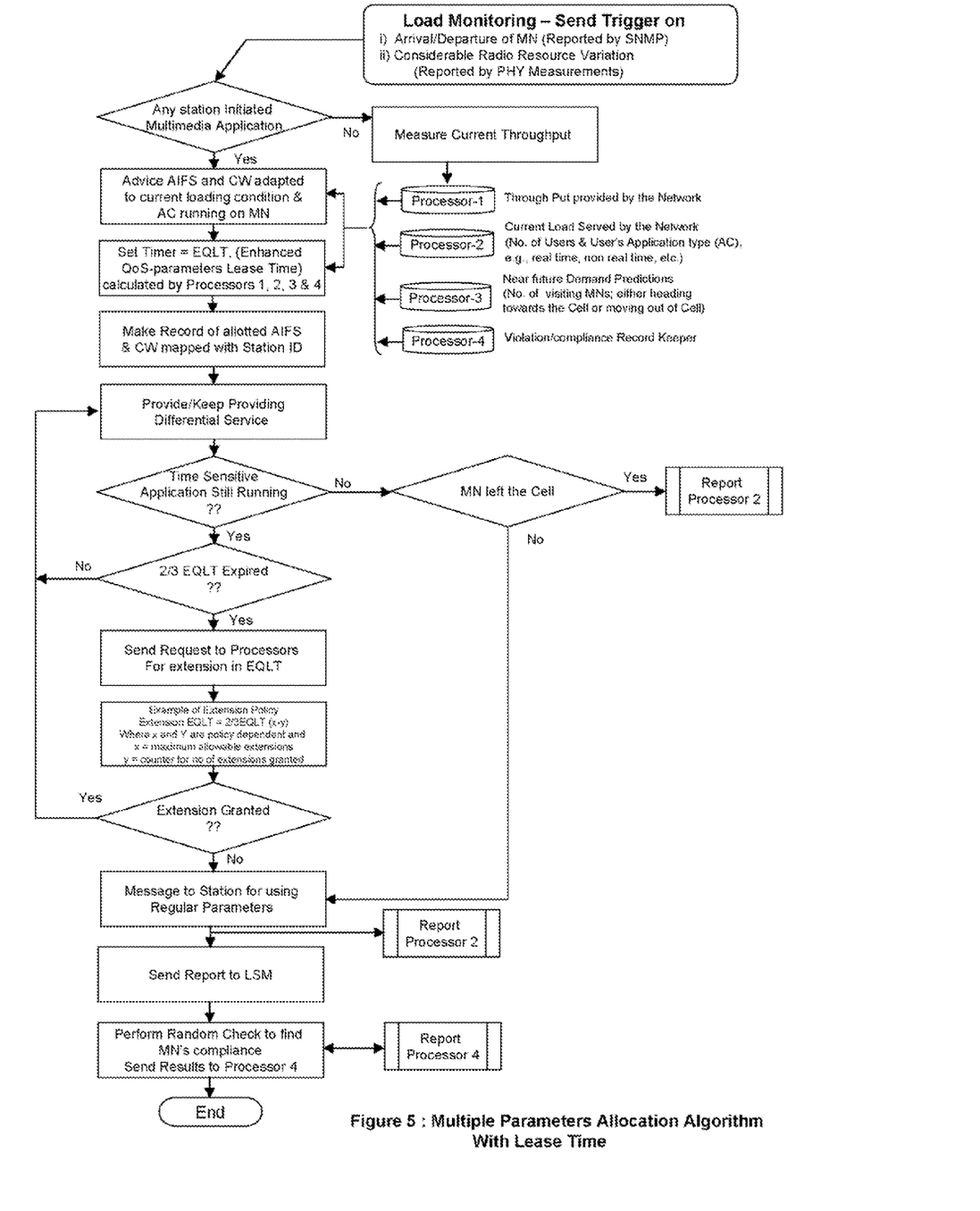
FIG. 5 is a flow chart representation of a multiple parameters allocation algorithm with lease time.

7. As illustrated in FIG. 4, the QPM, with the help of processor 4, will also perform random checks to find out if any MN is violating the QoS policy, i.e., using upgraded CAP even though its current application does not fall in differentiated access category. In case the violation is found a warning will be sent (not essentially human readable). If the violation persists additional follow-up warnings can be sent, as for example, two follow-up warnings, after which the access could be denied by informing the EP (Enforcement Point) or the SNMP (Simple Network Management Protocols). Additionally, a Human readable message "Access Denied-QoS Policy Violation Detected" can be sent. Additionally, Compliance/Violation detection can be provided in the system of the present invention. FIGS. 3 and 4 also show that the higher the number of violations detected, the higher the frequency of performing random checks, and the lower the violation detected, the lower the number of random checks that will be performed. Thus, based on the Compliance/Violation findings, the policing can be relaxed or tightened. This serves to reduce the signaling overheads in the cells where ethics holds values, The table shown in FIG. 2 exemplifies the values of CAP for four ACs for EDCA and the present system, A+/− indicates that the values can be dynamically adapted according to network conditions. The value A can be a discrete integer number of slot time for AIFS and exponential or linear step for CWmin and CWmax.

Usage of dynamically adaptable CAP regulated by the network will obviously not essentially increase the bandwidth, but rather introduces access probability differentiation among different traffic classes in an adaptable and regulated manner. An advantage of the present network controlled approach is that refinements of CAP can be done dynamically on a capacity on demand principle, depending on the current traffic load presented by all MNs and dully considering the legacy MNs. For example, when the resource demand is meager, size of CWmin can be further reduced to "CWmin−Δ" (where CWmin is default EDCA value) and when resource demand is high due to large number of users, the size of CWmin increased to CWmin+Δ (i.e., it can be prevented from going so low as to harm legacy MN's performance). The benefit of this flexibility is that under less loaded conditions, a much smaller CWmin can be advised that will contribute for added performance (because the smaller CWmin, the higher the probability of winning the contention with the other ACs will be) and under heavily loaded condition, comparatively greater CWmin can be advised to avoid collision on the channel (because the greater the CWmin values under congested condition, the significantly lesser the probability of collision on the channel will be).

By the same token, under less resource demand the size of AIFS can be further reduced to "AIFS−Δ" and under heavy resource demand AIFS can be increased to "AIFS+Δ". The benefit is that under heavily loaded condition, AIFS values will not be reduced to an extent that legacy DCF MNs get penalized.

Another embodiment of the present invention can be implemented in such a way that when an MN is first switched on, it can use default AFIS and CWmin set for best effort AC as a part of normal WLAN procedures and protocols and if qualified, gets a new CAP from the AP. In another implementation, the prevailing parameters can be communicated via beckons and the MN starts using the new CAP from the very beginning of the session.

In a further embodiment of the present invention, the AP can broadcast its capability to the MNs in the cell and have the MNs made to request for upgraded CAP based on the applications they are running on, and then have the network judiciously decide whether or not an upgraded CAP should be granted. This decision can be based on several factors, including negotiations between the network and the MN and non-violation agreement. However, negotiations are not preferred since back & forth signaling will consume time and radio resources.

In yet another embodiment, the network stability can be enhanced by watching MNs mobility profile, i.e., if the MN is rapidly traversing the cells and its attachments to the APs on its way are transitive, a lower priority for getting an upgraded CAP may result.

In yet a further embodiment of the present invention, the QPM may refrain from estimating the CWmax under light loaded conditions, because in low network congestion situations, changes in the CWmax parameter have limited effects on throughput differentiation.

In a further embodiment of present invention the Network may advise the deserving MNs to exploit the upgraded CAP (in case of favorable conditions, e.g., less load or enhanced throughput due to good radio conditions etc.), for a certain period of time, which period of time is calculated based on several causative factors. In this embodiment, the QPM will also calculate and set EQLT (Enhanced QoS-parameters Lease Time) for each MN running a real time application, EQLT is the time interval for which an MN is authorized to retain the differential treatment and benefit the enhanced performance. This duration can be small under unfavorable loading situations, long under favorable loading situation, or can be extendable depending on the prevailing loading conditions and a predefined policy. Calculation of EQLT is also based on the input of above noted processors. The concept of EQLT can be introduced to foster stability, i.e., to buffer the impact of rapidly changing conditions (due to either load variation or radio fluctuation or both) on on-going multimedia applications. The MN does not necessarily have to know how long upgraded CAP is offered for. Thus QPM does not inform MN about EQLT (the duration for which MN can enjoy enhanced parameters) but rather, initiates its own timer. At the end of EQLT, the QPM will signal the MN to stop using enhanced parameters. This can be a machine to machine message (Network to MN) and interpretation into human language is not necessary. By not communicating EQLT to MN unnecessary signaling between MN and Network that might otherwise be required for example at each extension or load adaptation, can be eliminated.

The QPM will keep the record of the CAP (upgraded, regular, or downgraded), that it offered to each MN in each cell duly mapped with the MNs' ID. The MNs' ID can be, for example, MAC addresses, IP address, or any other unique ID that could be used for identification of the client.

Advantages of the present system include, for example:
1. The existing techniques report that CW differentiation becomes less effective in high load conditions. It is considered as a fundamental inefficiency of the CW differentiation mechanism in high load conditions. Thus, choosing an appropriate CW range according to the current network holds vital importance to keep collision probability low enough to not provoke performance collapse. The capability to dynamically adapt to prevailing load conditions regulated by the network makes CAP differentiation an extremely effective approach, since it avoids CW settings that are too low under bad loading conditions;
2. WLAN employs smaller cells (Pico-cells) and therefore the number of hand-offs during a call's lifetime is likely to be greater. This reveals that the status of neighboring cells has an increased influence on the QoS of the local micro cell. Thus, in order to adapt to changes in traffic pattern, the status information of neighboring cells including potential hand-offs is considered in this QoS provisioning system. This leads to enhance the efficiency, stability, and robustness of QoS provisioning;
3. Users of different applications may experience different data rates, however since the QoS provisioning is regulated by the Network, the present system provides fairness to all calls within one class (Intraclass fairness), and to all MNs, including legacy MNs. Thus, it solves the currently debated technical issue of coexistence between legacy DCF MNs and EDCA MNs;
4. The underlying assumptions of the proposed system are more realistic than those in previous systems. The present system avoids frequent bandwidth switching among different levels and incorporates stability at various stages, e.g., by introducing EQLT, by making QPM to respond to the load variations if the variations are significant, and attributing network congestion first to the MNs having best effort AC; and
5. The present system saves bandwidth that otherwise might have been used for QoS negotiations. Moreover, it conserves battery power in the mobile MN by avoiding negotiation signaling. Thus, the present system improves the utilization of the radio resources.

Additional background information can be found in the following reference, the entire disclosure of which is incorporated herein by reference: [1] IEEE 802.11 WG, IEEE Std 802.11D.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments, (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example".

What is claimed is:

1. A method of dynamically setting values of Channel Access Parameters, comprising:
   implementing a Load Supervision Manager entity and a Quality of Service (QoS) Parameters Manager entity, said entities provided for working with at least one Access Point;
   continuously monitoring network loading conditions using the entities; and
   setting Channel Access Parameters values with the entities in response to the network loading conditions;
   wherein said Load Supervision Manager is a controlling and/or supervisory entity, sits at a network level, receives information from said QoS Parameters Manager sitting at subnet levels, and judges prevailing loading conditions, said prevailing loading conditions including at least one of a number of Mobile Nodes, and applications or Access Categories (ACs) they are running on in each subnet, and said Load Supervision Manager assesses the possible near future loading condition in each subnet including monitoring hand-off Mobile Nodes and issues directives to QoS Parameters Managers;
   wherein said Load Supervision Manager performs the following:
   a) periodically gets from the QoS Parameters Manager Current Load Information and from this information establishes Predicted Load Demand served by each Access Point;
   b) receives a copy of a message from a MAC Layer Management Entity of an Access Point through the QoS Parameters Manager of the cell where a Mobile Node is currently present, when the Mobile Node moves from one subnet to another,
   c) extracts from said message,
   (i) Source Address of the Access Point where the Mobile Node currently resides;
   (ii) Destination Address of the Access Point to which said Mobile Node intends to move and has requested Pre-authentication, and
   (iii) Current IP Address of said Mobile Node belonging to the network where the Mobile Node currently resides, and uses this information in assessing and predicting load conditions.

2. The method of claim 1, wherein said Load Supervision Manager informs the QoS Parameters Manage of the prospective subnet to which said Mobile Node is moving, ahead of time for dynamic adjustment re-adjustment of Arbitration InterFrame Space and CWmin on a per Mobile Node and a per class basis.

3. A network side method of dynamically setting values of Channel Access Parameters for Mobile Nodes, comprising:
   implementing a network side Load Supervision Manager entity and a network side Quality of Service (Qos) Parameters Manager entity, said entities provided for working with at least one Access Point;
   continuously monitoring network loading conditions using the network side entities;
   setting Channel Access Parameters values with the entities in response to the network loading conditions; and
   wherein said QoS Parameters Manager sits at a subnet level, monitors load, and initiates a multiple parameters allocation algorithm in response to load variation due to either arrival/departure of an Mobile Node, said arrival/departure being due either a new connection setup in a cell, hand-off in said cell, handing off to a neighboring cell, termination of connection, or radio resource fluctuation;
   wherein QoS Parameters Manager calculates and sets Enhanced QoS-parameters Lease Time for each Mobile Node running a real time application, initiates its own timer, and at the end of Enhanced QoS-parameters Lease Time, signals the Mobile Node to stop using enhanced parameters, thereby avoiding unnecessary signaling between Mobile Node and Network that might otherwise be required for notification to Mobile Nodes as to a modification of Lease Time.

4. An network side apparatus for dynamically setting values of Channel Access Parameters for Mobile Nodes within a network, the apparatus comprising:
   a network side Load Supervision Manager entity,
   a network side Quality of Service (QoS) Parameters Manager entity, and
   wherein said Load Supervision Manager entity and said QoS Parameters Manager entity communicate to the network through at least one Access Point,
   said network side entities working with said at least one Access Point and continuously monitoring network loading conditions and setting Channel Access Parameters values in response to the network loading conditions,
   wherein said QoS Parameters Manager is associated with a plurality of processors that determine currently available throughput of each cell by translating existent Signal to Noise Ratio into real time, monitor the total number of Mobile Nodes in a cell, their applications and their subscription profile, appraise future demand based on data from (i) Load Supervision Manager based on Mobile Node's handover to or from one cell to another and (ii) the historical log on how many connections are terminated or established, and how many hand-off connections occur on hourly, daily, weekly, and or monthly basis.

5. The apparatus of claim 4, where a processor is a violation/compliance record keeper.

\* \* \* \* \*

UNITED STATES PATENT AND TRADEMARK OFFICE
CERTIFICATE OF CORRECTION

PATENT NO.         : 9,100,874 B2                                      Page 1 of 2
APPLICATION NO.    : 11/567251
DATED              : August 4, 2015
INVENTOR(S)        : Yaqub et al.

It is certified that error appears in the above-identified patent and that said Letters Patent is hereby corrected as shown below:

In The Specification

In Column 1, Line 39, delete "computers," and insert -- computer, --, therefor.

In Column 2, Line 13, delete "e.g." and insert -- e.g., --, therefor.

In Column 2, Line 21, delete "e.g. USB, CODEC, UART, PCM, etch);" and insert -- e.g., USB, CODEC, UART, PCM, etc.); --, therefor.

In Column 2, Line 25, delete "e.g." and insert -- e.g., --, therefor.

In Column 3, Line 11, delete "3 G" and insert -- 3G --, therefor.

In Column 3, Line 12, delete "2.5 G" and insert -- 2.5G --, therefor.

In Column 3, Line 65, delete "realtime" and insert -- real-time --, therefor.

In Column 4, Line 16, delete "operation" and insert -- operation, --, therefor.

In Column 4, Line 65, delete "AG-BE" and insert -- AC-BE --, therefor.

In Column 5, Line 1, delete "FTP.)." and insert -- FTP. --, therefor.

In Column 5, Line 26, delete "AFPS" and insert -- AIFS --, therefor.

In Column 5, Line 41, delete "AFIS" and insert -- AIFS --, therefor.

In Column 5, Line 51, delete "AP" and insert -- CAP --, therefor.

In Column 5, Line 53, delete "AFIS" and insert -- AIFS --, therefor.

In Column 6, Line 53, delete "Arbitration InterFrame Space   (AIFS".

Signed and Sealed this
Fifteenth Day of March, 2016

Michelle K. Lee
*Director of the United States Patent and Trademark Office*

CERTIFICATE OF CORRECTION (continued)
U.S. Pat. No. 9,100,874 B2

In Column 6, Line 55, delete "Controlled" and insert -- Hybrid Controlled --, therefor.

In Column 7, Line 12, delete "aspects" and insert -- aspects, --, therefor.

In Column 8, Line 41, delete "FIG. 1" and insert -- FIG. 1, --, therefor.

In Column 8, Line 59, delete "functions." and insert -- functions: --, therefor.

In Column 9, Line 3, delete "Pre-authentication)" and insert -- Pre-authentication), --, therefor.

In Column 9, Line 9, delete "AFIS" and insert -- AIFS --, therefor.

In Column 9, Line 47, delete "power" and insert -- power, --, therefor.

In Column 9, Line 51, delete "etc.,)" and insert -- etc.), --, therefor.

In Column 9, Line 61, delete "and or" and insert -- and/or --, therefor.

In Column 10, Line 56, delete "values," and insert -- values. --, therefor.

In Column 11, Line 3, delete "dully" and insert -- duly --, therefor.

In Column 11, Line 27, delete "AFIS" and insert -- AIFS --, therefor.

In Column 11, Line 60, delete "application," and insert -- application. --, therefor.

In Column 12, Line 32, delete "hand-offs" and insert -- handoffs --, therefor.

In The Claims

In Column 14, Line 15, in Claim 2, delete "Manage" and insert -- Manager --, therefor.

In Column 14, Line 34, in Claim 3, delete "due" and insert -- due to --, therefor.

In Column 14, Line 47, in Claim 4, delete "An network" and insert -- A network --, therefor.

In Column 15, Line 4, in Claim 4, delete "and or" and insert -- and/or --, therefor.